(12) United States Patent
Yukitake et al.

(10) Patent No.: US 8,023,816 B2
(45) Date of Patent: Sep. 20, 2011

(54) CAMERA AND CONTROL METHOD THEREOF

(75) Inventors: Akira Yukitake, Tokyo (JP); Takeshi Kobayashi, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 401 days.

(21) Appl. No.: 11/650,192

(22) Filed: Jan. 5, 2007

(65) Prior Publication Data

US 2007/0172224 A1 Jul. 26, 2007

(30) Foreign Application Priority Data

Jan. 25, 2006 (JP) ................................. 2006-016327

(51) Int. Cl.
G03B 17/18 (2006.01)
(52) U.S. Cl. .................................. 396/287; 348/333.02
(58) Field of Classification Search .................. 396/287, 396/238, 242, 243, 291, 239, 281, 299; 348/220.1, 348/231.3, 333.02
See application file for complete search history.

(56) References Cited

U.S. PATENT DOCUMENTS

| | | | | | |
|---|---|---|---|---|---|
| 5,585,878 | A | * | 12/1996 | Matsukawa | 396/281 |
| 5,682,559 | A | * | 10/1997 | Yoshino et al. | 396/121 |
| 5,913,086 | A | * | 6/1999 | Kawamura et al. | 396/223 |
| 6,654,559 | B2 | | 11/2003 | Aoyama | |
| 6,801,718 | B2 | * | 10/2004 | Umetsu et al. | 396/287 |
| 6,829,009 | B2 | * | 12/2004 | Sugimoto | 348/333.02 |
| 7,106,375 | B2 | * | 9/2006 | Venturino et al. | 348/333.02 |
| 7,385,597 | B2 | * | 6/2008 | Fukuda et al. | 345/184 |
| 7,409,411 | B2 | * | 8/2008 | Sato | 707/104.1 |
| 2002/0030754 | A1 | * | 3/2002 | Sugimoto | 348/333.02 |
| 2002/0037166 | A1 | * | 3/2002 | Nagahata et al. | 396/121 |
| 2002/0054146 | A1 | * | 5/2002 | Fukumoto et al. | 345/810 |
| 2002/0147819 | A1 | * | 10/2002 | Miyakoshi et al. | 709/228 |
| 2002/0172516 | A1 | * | 11/2002 | Aoyama | 396/287 |
| 2004/0233316 | A1 | * | 11/2004 | Battles et al. | 348/333.02 |
| 2005/0174489 | A1 | * | 8/2005 | Yokoyama et al. | 348/553 |
| 2005/0177800 | A1 | * | 8/2005 | Suzuki et al. | 715/823 |
| 2005/0271380 | A1 | * | 12/2005 | Kishii | 396/299 |
| 2006/0045514 | A1 | * | 3/2006 | Matsushita et al. | 396/299 |
| 2006/0062564 | A1 | * | 3/2006 | Dalton et al. | 396/291 |
| 2006/0072028 | A1 | * | 4/2006 | Hong | 348/333.01 |
| 2006/0259477 | A1 | * | 11/2006 | Morita | 707/3 |
| 2007/0033626 | A1 | * | 2/2007 | Yang et al. | 725/105 |
| 2007/0126877 | A1 | * | 6/2007 | Yang | 348/207.99 |
| 2008/0050107 | A1 | * | 2/2008 | Yamashita et al. | 396/89 |

FOREIGN PATENT DOCUMENTS

| | | |
|---|---|---|
| EP | 840504 A1 * | 5/1998 |
| JP | A-2002-341426 | 11/2002 |
| JP | A-2003-330057 | 11/2003 |
| JP | 2004-165782 | 6/2004 |

OTHER PUBLICATIONS

Machine translation of JP 2004-165782 A.* First Notification of Office Action for Chinese Patent Application No. 200710002634.0, mailed Oct. 10, 2008 (4 pgs.) with translation (6 pgs.).

* cited by examiner

Primary Examiner — Rodney E Fuller
Assistant Examiner — Linda B Smith
(74) Attorney, Agent, or Firm — John C. Pokotylo; Straub & Pokotylo

(57) ABSTRACT

A camera can display, record and play image data after converting a captured image into the digital data. The camera comprises a guidance display setting means for causing a hierarchical guidance display to be made in order to set at least a control of a shooting operation, an item selection means for selecting an item displayed in the set guidance display, a shooting control setting means for setting a control which corresponds to the selected item, and a display control means for displaying information about a setting when the setting of the control is made.

11 Claims, 10 Drawing Sheets

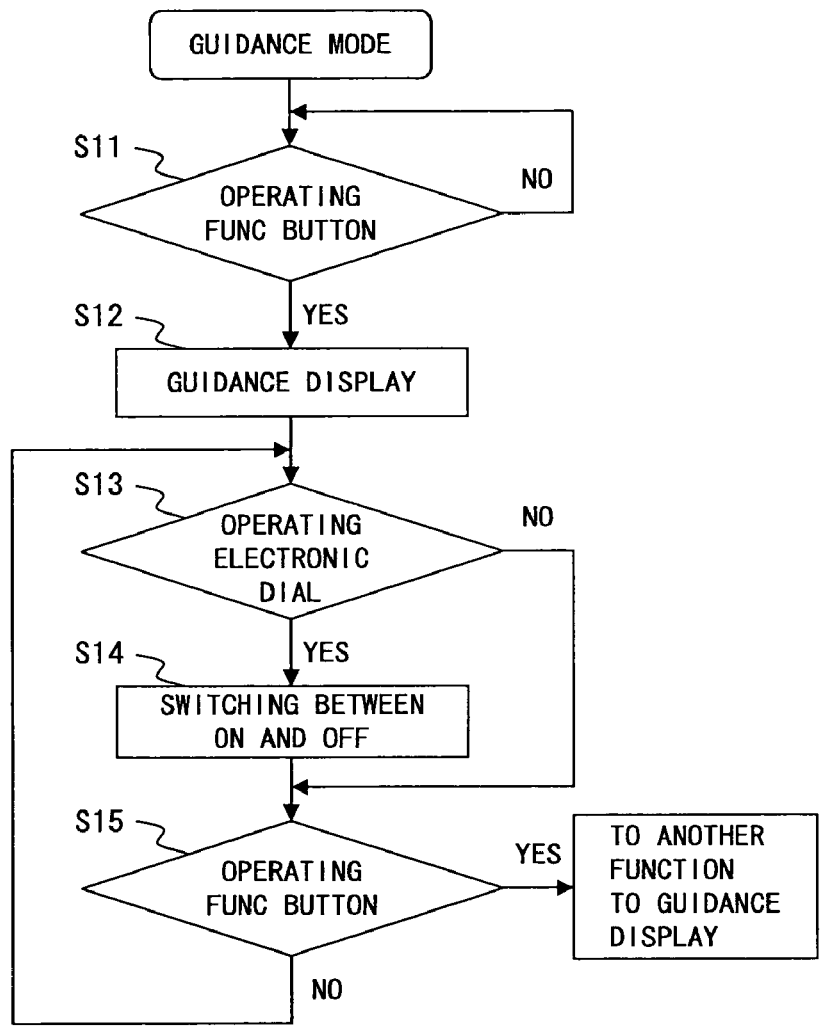
F I G. 1

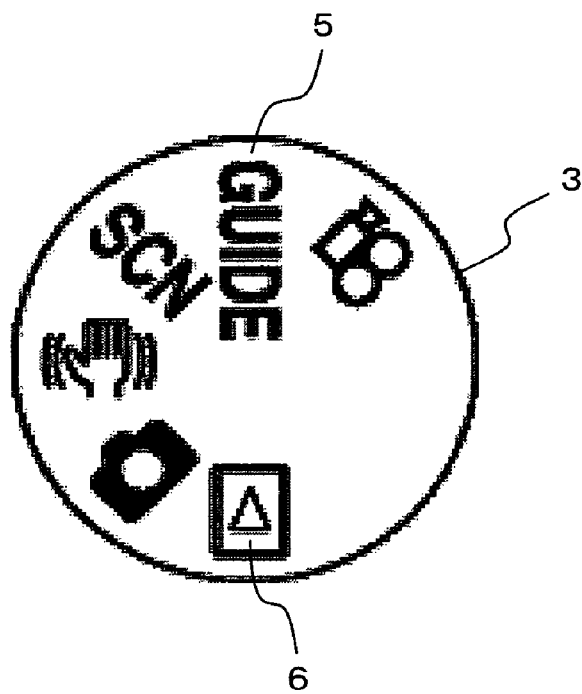
F I G. 3

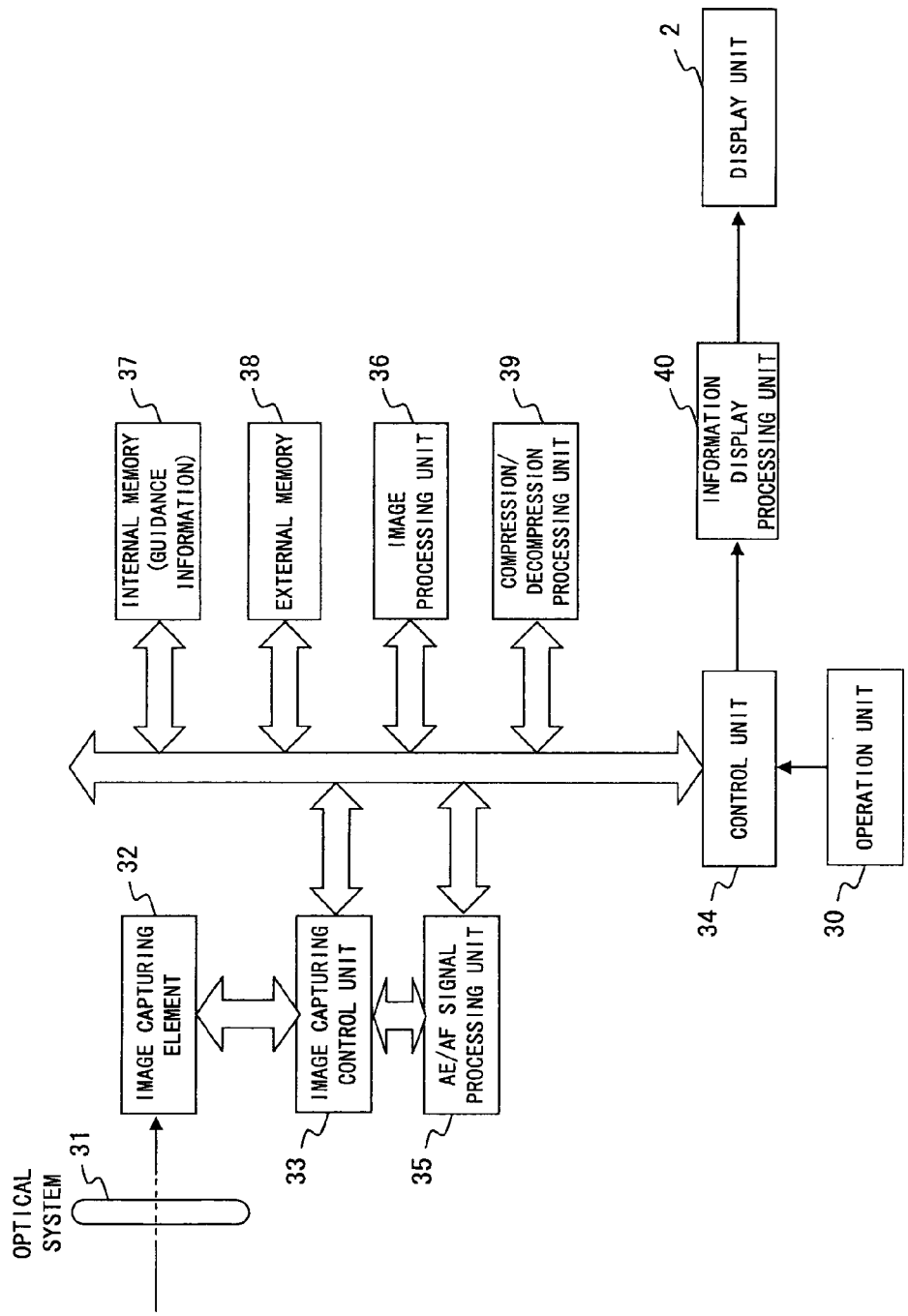
F I G. 4

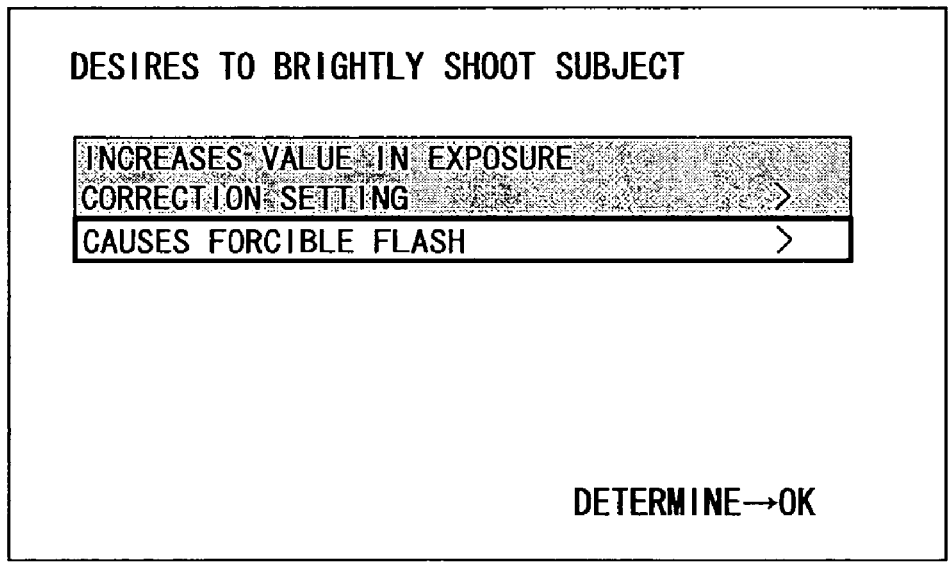
F I G. 8

F I G. 9

| | GUIDE | | SHOOTING STANDBY DISPLAY |
|---|---|---|---|
| | 1 HIERARCHY | 2 HIERARCHY | |
| 1 | DESIRES TO BRIGHTLY SHOOTING SUBJECT | INCREASE VALUE IN EXPOSURE CORRECTION SETTING | DISPLAY +1.0EV, AND MESSAGE "SETTING COMPLETE" FOR 3 SECONDS |
| | | CAUSES FORCIBLE FLASH | DISPLAY FORCIBLE FLASH ICON, AND MESSAGE "SETTING COMPLETE" FOR 3 SECONDS |
| 2 | DESIRES TO BACKLIGHT SHOOTING | CAUSES FORCIBLE FLASH | DISPLAY FORCIBLE FLASH ICON, AND MESSAGE "SETTING COMPLETE" FOR 3 SECONDS |
| | | SPOT METERING | DISPLAY SPOT ICON, AND MESSAGE "SETTING COMPLETE" FOR 3 SECONDS |
| | | INCREASE VALUE IN EXPOSURE CORRECTION SETTING | DISPLAY +1.0EV, AND MESSAGE "SETTING COMPLETE" FOR 3 SECONDS |
| 3 | DESIRES NATURAL COLOR SUITABLE FOR LIGHT SOURCE | SETS TO FINE WEATHER | DISPLAY FINE WEATHER ICON, AND MESSAGE "SETTING COMPLETE" FOR 3 SECONDS |
| | | SETS TO CLOUDY WEATHER | DISPLAY CLOUDY WEATHER ICON, AND MESSAGE "SETTING COMPLETE" FOR 3 SECONDS |
| | | SETS TO BULB | DISPLAY BULB ICON, AND MESSAGE "SETTING COMPLETE" FOR 3 SECONDS |
| | | SETS TO DAYLIGHT FLUORESCENT | DISPLAY DAYLIGHT FLUORESCENT ICON, MESSAGE "SETTING COMPLETE" FOR 3 SECONDS |
| | | SETS TO DAY WHITE FLUORESCENT | DISPLAY DAY WHITE FLUORESCENT ICON, MESSAGE "SETTING COMPLETE" FOR 3 SECONDS |
| | | SETS TO WHITE FLUORESCENT | DISPLAY WHITE FLUORESCENT ICON, MESSAGE "SETTING COMPLETE" FOR 3 SECONDS |
| 4 | DESIRES TO BEAUTIFULLY BLUR AWAY BACKGROUND OF SUBJECT | SETS ZOOM TO TELEPHOTO | TELEPHOTO IS SET. AFTER LENS FRAME OPERATES, DISPLAYS MESSAGE "SETTING COMPLETE" FOR 3 SECONDS. THEREAFTER ZOOM BUTTON IS NOT ACCEPTED UNTILL RESET |
| 5 | DESIRES TO FOCUS IN FORWARD AND BACKWARD DIRECTION | SETS ZOOM TO WIDE-ANGLE | WIDE IS SET. AFTER LENS FRAME OPERATES, DISPLAYS MESSAGE "SETTING COMPLETE" FOR 3 SECONDS. THEREAFTER ZOOM BUTTON IS NOT ACCEPTED UNTILL RESET. |
| 6 | ........ | ........ | ........ |
| 7 | DESIRES TO MAKE SHOOTING AFTER VERIFYING COMPOSITION | DISPLAYS FIRST COMPOSITION LINES | ........ |
| | | DISPLAYS SECOND COMPOSITION LENS | ........ |
| 8 | ........ | ........ | ........ |
| 9 | ........ | ........ | ........ |
| 10 | DESIRES TO REDUCE HAND SHAKE | SETS TO SHAKE REDUCTION MODE | ........ |
| 11 | ........ | ........ | ........ |
| 12 | DESIRES TO MAKE SHOOTING WITH IMAGE QUALITY SUITING PURPOSE | DESIRES TO MAKE SHOOTING WITH IMAGE QUALITY SUITABLE FOR LARGE-SIZED PRINTING | ........ |
| | | DESIRES TO MAKE SHOOTING WITH STANDARD IMAGE QUALITY | |
| | | DESIRES TO MAKE SHOOTING WITH IMAGE QUALITY SUITABLE FOR L SIZE/POSTCARD | |

F I G. 1 0

CAMERA AND CONTROL METHOD THEREOF

CROSS REFERENCE TO RELATED APPLICATIONS

This application is based upon and claims the benefit of priority from the prior Japanese Patent Application No. 2006-16327, filed Jan. 25, 2006, the entire contents of which are incorporated herein by reference.

BACKGROUND OF THE INVENTION

1. Field of the Invention

The present invention relates to a technique for implementing an operation and a control, which suits the intention of a user, and more particularly, to a technique for causing, for example, a user unaccustomed to a camera to simply and intuitively make a shooting control setting of the camera.

2. Description of the Related Art

With the recent enhancement and complexity of functions of a digital camera, a large amount of information has been provided to a camera user in order to set the operation state or the operation conditions of the digital camera. Additionally, as a way of providing information to a camera user, a technique for setting a necessary function by displaying guidance information that describes operation members, an operation method and the like has been recently known (see the following Patent Document 1).

FIG. 1 is a diagram showing the operations flow of a camera that sets a necessary function while being guided in accordance with conventionally displayed guidance disclosed by Patent Document 1. With this camera, guidance information about an operation member can be displayed when any of a plurality of operation members is operated. If a FUNC button (not shown) is operated in S11 in FIG. 1, the flow goes to S12 where a control circuit (not shown) displays guidance information on a liquid crystal panel (not shown). Then, for example, in electronic sound setting mode, an electronic sound is switched between ON and OFF (S14) each time an electronic dial is operated (S13). If the FUNC button is operated at this time (S15), the control circuit switches to a mode corresponding to another function, displays guidance information corresponding to the switched mode, and makes detailed settings in the mode set at that time.

[Patent Document 1] Japanese Published Unexamined Patent Application No. 2003-330057

SUMMARY OF THE INVENTION

A camera according to the present invention comprises a guidance display setting means for causing a hierarchical guidance display to be made in order to set at least a control of a shooting operation, an item selection means for selecting an item displayed in the guidance display set by the guidance display setting means, a shooting control setting means for setting a control which corresponds to the item selected by the item selection means, and a display control means for displaying information about a setting when the setting of the control is made by the shooting control setting means.

BRIEF DESCRIPTION OF THE DRAWINGS

FIG. 1 is a diagram showing the operations flow of a digital camera that sets a necessary function displayed in conventional guidance;

FIG. 3 shows a specific example of items of modes written on a mode dial according to a preferred embodiment of the present invention;

FIG. 4 is a block diagram showing an internal configuration of the digital camera implementing the present invention shown in FIG. 2;

FIG. 8 exemplifies a display of a guidance second layer of hierarchy according to the preferred embodiment of the present invention;

FIG. 9 exemplifies a display screen after a control condition setting according to the preferred embodiment of the present invention is made; and FIG. 10 shows a table that summarizes examples of the guidance 1 and 2 hierarchies according to the preferred embodiment of the present invention, and a display example of control conditions set during shooting standby.

DESCRIPTION OF THE PREFERRED EMBODIMENTS

A preferred embodiment according to the present invention is hereinafter described with reference to the drawings.

Figure 2:
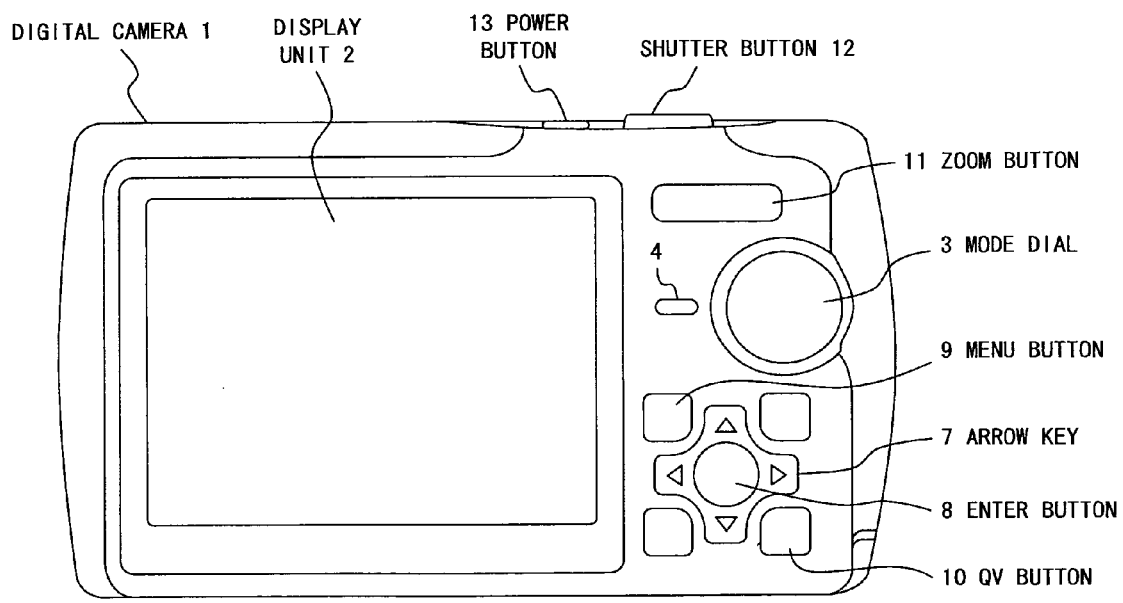
FIG. 2 is an external view showing the back of the main body of a digital camera implementing the present invention.

FIG. 2 is an external view showing the back of the main body of a digital camera implementing the present invention.

In this figure, a display unit 2 arranged on the back of the main body of the digital camera 1 is a part for displaying a through image, which is an image being captured with an image capturing element provided within the digital camera 1, for displaying setting information indicating the setting state of a shooting operation, which is made for the digital camera 1, and for displaying state information indicating the state of the current operation of the digital camera 1. This unit is configured with a color LCD (Liquid Crystal Display). Additionally, the display unit 2 is a part for displaying a shot image recorded in an external memory (such as a memory card), which is an image data recording medium, in the digital camera 1.

A mode dial 3 enables a mode instruction to be given by rotating an item written on the dial to a mark 4 provided on the back of the main body of the digital camera 1. FIG. 3 shows a specific example of items of modes written on the mode dial 3. As an example, items of 6 modes are written on the dial. The items of 6 modes written on the dial can be broadly classified into a shooting mode and a play mode. As items related to the present invention among these items, a GUIDE position and a play (displayed as a triangle within a rectangle) position 6 are described respectively as the shooting mode and the play mode, and the rest of the items is not referred to in this specification.

An arrow key 7 is configured with an arrow key the arrows of which respectively indicate operation directions. The arrow key 7 is operated by a user when an instruction to select an item or an instruction to change a display item at the time of the display of various types of items on the display unit 2 is given. Additionally, at the time of normal shooting, the arrow key 7 enables correction amounts, such as an exposure correction, a tone correction, etc., which are related to the shooting, to be selected and set. In the center of the arrow key 7, an enter button 8 is arranged. The enter button 8 is operated by a user when the contents of an instruction given from the user are confirmed.

A MENU button 9 is a button for causing the display unit 2 to display MENU. The MENU button 9 is also used as a button for resetting a guidance operation to its start if this button is operated during the guidance operation to be described later.

A QV (Quick View) button 10 is a button for causing the display unit 2 to quickly display image data. This button is used as a button for switching to the play mode with an operation.

A zoom button 11 is a button for causing the display unit 2 to display a zoomed image. With an operation at the right end or the left end of this button, T (Telephoto) or W (Wide) can be set.

A shutter button 12 is a two-step switch. Metering and ranging are made in a state where the shutter button 12 is pressed halfway to the first step. If the shutter button 12 is further pressed from the halfway state to the second step (in a fully pressed state), the shutter operates to make image capturing.

A power button 13 is a switch for turning on/off the power of the camera. Its switch-on activates the digital camera, whereas its switch-off deactivates the function as the digital camera 1.

The digital camera 1 shown in FIG. 2 is also provided with various types of buttons operated to give an instruction from a user to the digital camera 1 in addition to the above-described buttons. Since these buttons are not directly related to this specification, their descriptions are omitted.

FIG. 4 is a block diagram showing an internal configuration of the digital camera 1 which implements the present invention shown in FIG. 2. In FIG. 4, an operation unit 30 is a generic name of a switch group operated by a user, and a control unit 34 obtains an instruction from a user based on operations of various types of buttons, which are performed by the user for the operation unit 30.

An optical system 31 forms a subject image on the surface of an image capturing element 32. The image capturing element 32 is configured with an element composed of a CCD (Charge Coupled Device) or a CMOS (Complementary Metal Oxide Semiconductor). The image capturing element 32 photo-electrically converts the subject image formed with the action of the optical system 31, and outputs an electric signal that represents the subject image.

An image capturing control unit 33 converts the analog electric signal of the subject image, which is output from the image capturing element 32, into digital image data, and transmits the converted digital image data to the control unit 34. The control unit 34 obtains information for setting suitable exposure condition and focusing condition for the subject image by measuring the brightness of the subject and a distance to the subject based on the digital image data, also obtains suitable image data by automatically adjusting the settings of the suitable exposure condition and focusing condition for the subject image in an AE/AF (Auto exposure/ Auto Focus) signal processing unit 35, and passes the obtained image data to an image processing unit 36.

The image processing unit 36 executes correction processes such as a white balance, a γ correction, etc. for the image data output from the image capturing control unit 33. The image data processed by the image processing unit 36 is stored in an internal memory 37, and also stored in an external memory (including a memory card) 38 depending on need.

Information for making a shooting control setting in accordance with guidance according to the present invention, which will be described later, is held in the internal memory 37 as a table, and used by the control unit 34.

A compression/decompression processing unit 39 executes a data compression process for the image data output from the image processing unit 36 when the digital camera 1 performs a shooting operation, or executes a data decompression process for the image data read from the external memory 38 when the digital camera 1 performs a play operation.

The external memory (including a memory card) 38 is a semiconductor recording medium for recording various types of data such as image data, sound data, etc., and attachable/ detachable to/from the digital camera 1.

An information display processing unit 40 processes/converts the image data output from the image processing unit 36 when the digital camera 1 performs a shooting operation, or the image data read from the compression/decompression processing unit 39 when the digital camera 1 performs a play operation, and executes a process for generating and outputting a video signal that causes the display unit 2 to display the image represented by the image data according to an instruction from the control unit 34. The information display processing unit 40 generates a video signal from the image data output from the image processing unit 36, whereby a live view, a menu image, etc. is displayed on the display unit 2.

The control unit 34 controls the operations of the entire digital camera 1 by executing a control program prepared in the internal memory 37. This control program includes a program for causing the control unit 34 to execute various types of processes to be described later. The control unit 34 executes this control program, whereby the various types of processes to be described later can be executed by the control unit 34.

Figure 5:
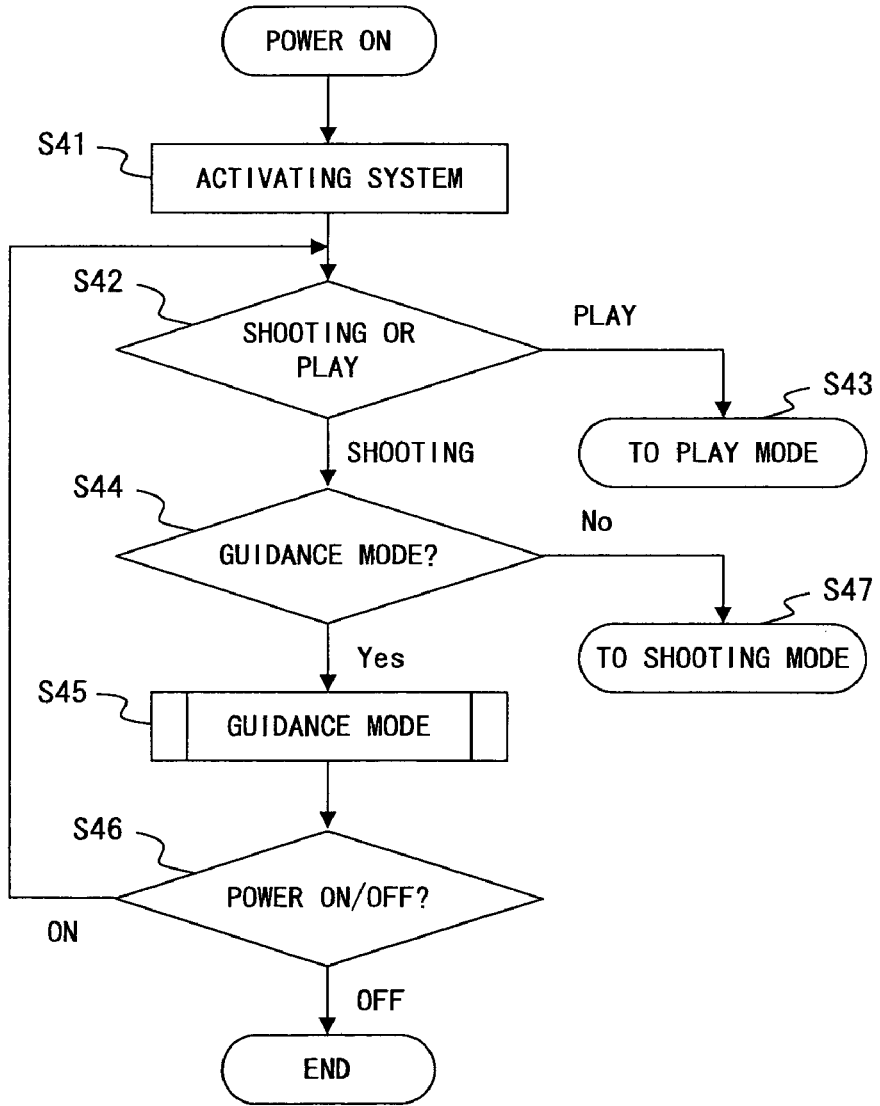
FIG. 5 is a main flowchart for explaining the operations of the digital camera according to the preferred embodiment of the present invention.

FIG. 5 is a main flowchart for explaining the operations of the digital camera according to the preferred embodiment of the present invention. In this figure, the operations of the digital camera according to the preferred embodiment of the present invention start with the switch-on of the power button 13 shown in FIG. 2, and the system for the digital camera 1 is activated (step 41. step is abbreviated to S in the drawings). Next, in step 42, it is judged whether a user instruction given with the mode dial 3 shown in FIG. 3 is either for the shooting mode or for the play mode. If the user instruction given with the mode dial 3 is in the play (triangle within the rectangle) position 6, namely, if the user instruction directs a play, the flow goes to step 43 to switch to the play mode. Or, if the user instruction is for the shooting mode (other than the play mode), the flow goes to step 44. Then, it is judged whether or not the user instruction given with the mode dial 3 is in the GUIDE position 5, namely, whether or not the user instruction directs the guidance mode. If the user instruction directs the guidance mode, the flow goes to step 45 to switch to the guidance mode. Then, in the guidance mode, ON/OFF of the power switch is monitored in step 46. If the power switch is OFF, the camera function is terminated. Or, if the power switch is ON, the flow goes back to step 42 (step 46). If the user instruction directs not the GUIDE position 5 but a position of another shooting mode, the flow goes to step 47 to switch to a shooting mode other than the guidance mode. The digital camera according to the preferred embodiment of the present invention can switch to the guidance mode via the above-described flow.

Here, the guidance mode is described. As stated earlier, the guidance mode in this preferred embodiment in FIG. 3 is set by selecting the GUIDE position 5 written on the mode dial 3.

This mode is provided to enable an optimum setting to be easily made, for example, if a person who takes a photo does not know settings to realize an image although he or she has an anticipated finish of the shot image, such as when the person desires to shoot his or her anticipated photo.

Namely, a shooting condition is changed in accordance with the intention of the person who takes a photo. Specifically, a condition determined to be suitable for the intention of the person who takes a photo is selected from among conditions of items displayed on the display screen of the digital camera. New conditions composed of a plurality of options of conditions are further displayed for the result of the selection, and an item optimum for the intention of the person is selected in a similar manner.

At this time, the shooting condition is not required to be a specific numeric value. A judgment, which is more suitable for the sense, can be rather made with an expression, which is close to the sensitivity of the person who takes a photo and represents a shooting condition, even if it is ambiguous. For example, if a plus correction is made to exposure, the function "exposure correction" is not merely described, or its correction value is not represented as "+1.5 EV". In this case, an expression "desires to make shooting more brightly", which is close to the desire or the intention of a person who takes a photo, makes it easier for the person such as a novice to form a judgment.

As described above, an item suitable for the intention of a person who takes a photo is selected from among displayed items representing shooting conditions while being judged, whereby an optimum setting can be made without requiring specialized knowledge while reflecting the desire of the person who takes a photo. Note that a specific numeric value may be displayed as auxiliary information simultaneously with the above described ambiguous expression.

Figure 6:
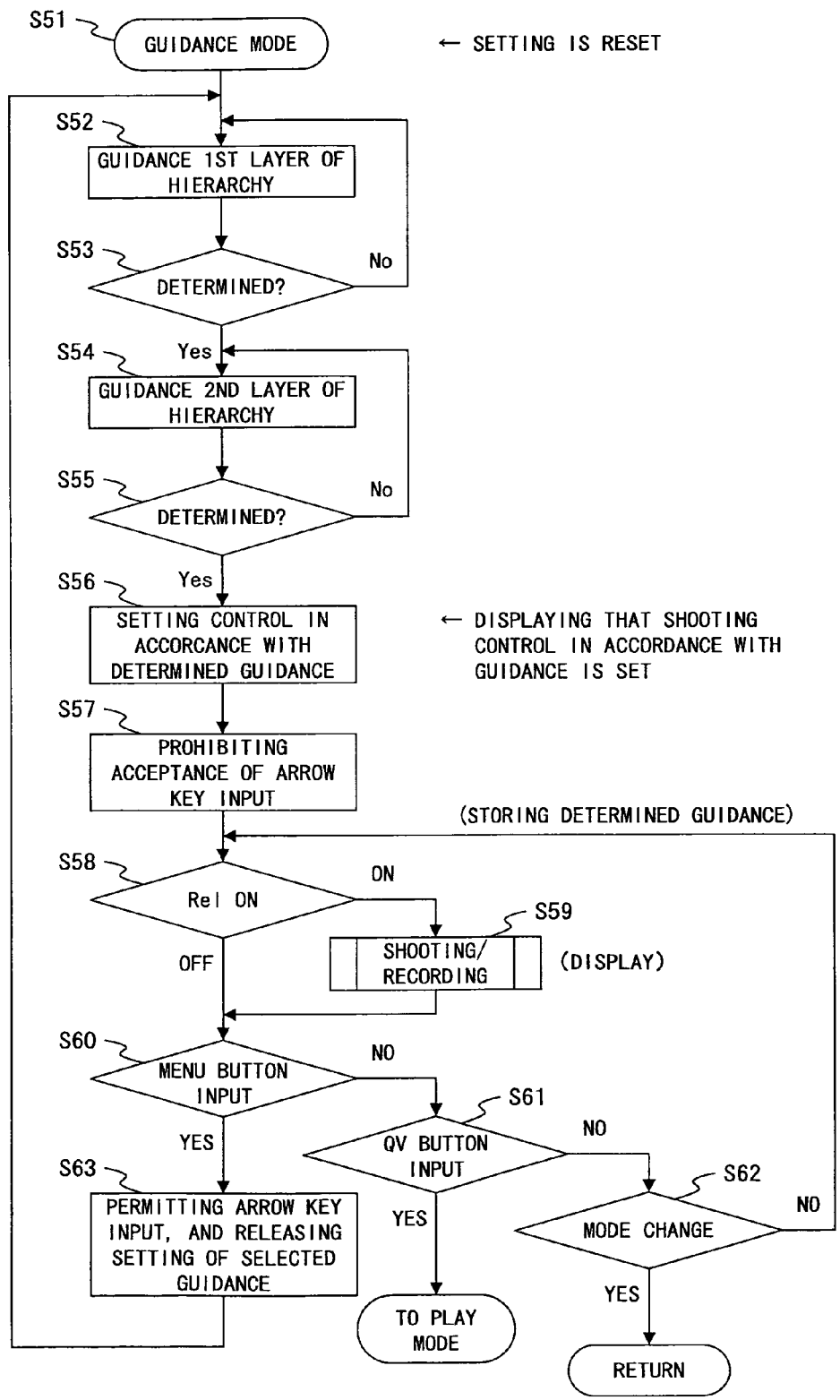
FIG. 6 is a flowchart for explaining setting operations in accordance with the guidance of the digital camera according to the preferred embodiment of the present invention.

FIG. 6 is a flowchart for explaining operations performed in the guidance mode of the digital camera according to the preferred embodiment of the present invention. The guidance mode is started at step 51 of FIG. 6. Next, in step 52, a display of a guidance first layer of hierarchy is made. The display of the guidance first layer of hierarchy is exemplified in FIG. 7. This figure depicts that 5 options in the guidance first layer of hierarchy are simultaneously displayed on one screen, and a cursor is positioned in an item "desires to brightly shoot a subject", which is displayed at the top. For the screen display of the guidance first layer of hierarchy, also items, which are not currently made visible on the screen, can be displayed on the screen with scrolling. The scrolling can be made by using the arrow key 7 shown in FIG. 2. A specific example of items displayed in the guidance first layer of hierarchy is shown in FIG. 10. This will be described later.

Next, in step 53, it is judged whether or not an option in the guidance first layer of hierarchy is determined. The determination is made by operating the enter key 8 shown in FIG. 2. If the determination is made, the flow goes to step 54. Or, if the determination is not made, the flow goes back to step 52. In step 54, a display of the guidance second layer of hierarchy is made. The guidance second layer of hierarchy is a hierarchy implemented by expanding a lower layer of hierarchy in the guidance first layer of hierarchy. A display of the guidance second layer of hierarchy is exemplified in FIG. 8. This figure shows the case where the item "desires to brightly shoot a subject" is selected in the guidance first layer of hierarchy. This figure depicts that two options in the lower layer of hierarchy are displayed together with the displayed item "desires to brightly shoot a subject" selected in the guidance first layer of hierarchy, and the cursor is positioned in an item "causes forcible flash" in the lower layer of hierarchy. A specific example of items displayed in the guidance second layer of hierarchy is shown in FIG. 10. This will be described later.

Next, it is judged in step 55 whether or not an option in the guidance second layer of hierarchy is determined. If the determination is made, the flow goes to step 56. Or, if the determination is not made, the flow goes back to step 54. In step 56, a control condition is set in accordance with the guidance based on the determinations made in the guidance 1 and 2 hierarchies.

When the control condition is set in accordance with the guidance, a display such that the control condition in accordance with the guidance is set is made on the display unit 2 shown in FIG. 2. FIG. 9 exemplifies a display made on the display screen of the display unit 2 after the control condition is set. A display of characters "GUIDE" enclosed by a rectangle in an upper portion of the screen, and a display of a message "setting complete" (set to disappear after being displayed just for 3 seconds as indicated by a shooting standby display column of FIG. 10) in the periphery of the display screen of the display unit 2 are made, and an icon corresponding to the set control condition (such as a forcible flash icon) is displayed in the periphery of the right side of the display screen. The example of the display made on the display screen of the display unit 2 after the control condition is set is not limited to the example of FIG. 9. The display can be made with an icon, a mark, an illustration, etc.

Figure 7:
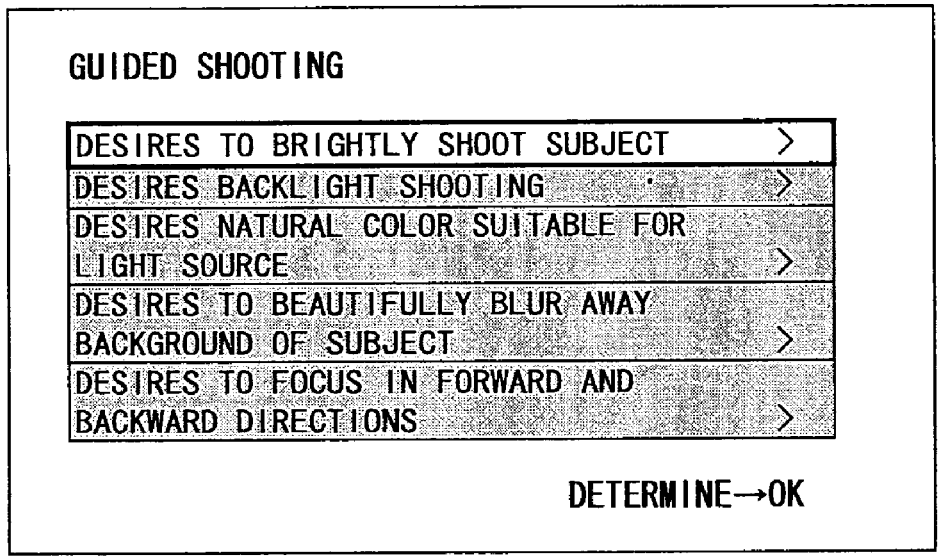
FIG. 7 exemplifies a display of a guidance first layer of hierarchy according to the preferred embodiment of the present invention.

FIG. 10 summarizes, as a table, the examples of the guidance 1 and 2 hierarchies according to the preferred embodiment of the present invention, and a display example of control conditions set in a shooting standby state. In FIG. 10, contents of all of guidance items are not described, but at least contents of the guidance items displayed in FIGS. 7 and 8 are described. A user selects an item in accordance with the hierarchical guidance shown in FIG. 10, whereby he or she can simply and intuitively make a shooting control setting of the digital camera.

When a control condition selected in accordance with the guidance is set with the operation of the enter key 8 in step 56, the acceptance of an arrow key 7 input is prohibited in step 57. Next, it is judged in step 58 whether or not the shutter button 12 shown in FIG. 2 is pressed. If the shutter button 12 is fully pressed, namely, if a release is ON, the flow goes to step 59 where shooting and recording can be made under the set control condition. Also a display can be made in this case. Then, if a finger is apart from the shutter button 12 (release is OFF), and if a MENU button input is made by a user in step 60 although shooting is not made, the acceptance of an arrow key 7 input is permitted in step 63, and the setting of the guidance is released. Thereafter, the flow goes back to step 52 where the guidance first layer of hierarchy is displayed. Additionally, if a QV button input is made in step 61 although a MENU button input is not made, switching is made from the guidance mode to the play mode. Furthermore, if an instruction to change mode is given with the operation of the mode dial 3 in step 62 although a QV button input is not made in step 61, the flow goes back to step 51 where the setting is reset, and a setting operation in accordance with the guidance mode is started. If the instruction to change mode is not given in step 62, the determined guidance is stored, and the flow goes back to step 58 where a release ON is awaited.

The setting operation in accordance with the guidance mode is performed as described above. However, remember that the setting of the camera is prohibited from being changed with a direct button operation when a control is set once by performing the setting operation in accordance with the guidance mode. Namely, after the shooting control is performed, only the operations of the power switch, the shutter button, the zoom button, the MENU button, and the QV button are permitted. Other operations are invalidated. That is, a situation, in which if a change in the setting of the camera with an operation is validated in the shooting standby state, a user (such as a novice user) unaccustomed to the camera is confused about a shooting control setting, and makes an inconsistent shooting control setting with the press of a control button, etc. in a state where the user cannot understand the shooting control setting although he or she makes the shooting control setting of the camera more easily with the shooting control setting in accordance with the guidance mode, must be avoided. If the user desires to release or change the shooting control setting at any cost, the shooting control setting is allowed to be released or changed only under a condition where the MENU button is operated while ON of the release button is being awaited, namely, in the shooting standby state, and a shooting control setting operation in accordance with the guidance is allowed to restart. In this way, a user can perform a shooting control setting operation in accordance with the guidance mode without anxiety.

The present invention has been described by being applied to the digital camera as mentioned above. However, the present invention is not limited to the digital camera, and applicable to portable devices, etc. equipped with a camera as a matter of course.

What is claimed is:

1. A camera that can display, record and play digital data after converting an image captured with an image capturing element into the digital data, comprising:
   a guidance display setting means for displaying and setting, as a first layer of a hierarchy, a plurality of guidance selection items, each item being represented as an expression corresponding to an intention of a person who takes a photo and indicating a desired finished quality of a shot image instead of a parameter value setting, to be used when capturing an image;
   a recording means for correspondingly recording more than one selection item that indicates a shooting operation condition instead of the parameter value setting, to be used when capturing an image as a selection item of a second layer of the hierarchy that is a lower layer of each guidance selection item displayed on the first layer of the hierarchy;
   an item selection means for selecting a selection item, from the second layer, that indicates a shooting operation condition, and that is displayed in response to one guidance item selected from the guidance selection items set as the display of the first layer;
   a shooting control setting means for setting a shooting control for capturing an image with the image capturing element which corresponds to the item selected by the item selection means; and
   a display control means for displaying information about a setting when the setting of the control is made by the shooting control setting means,
      wherein the plurality of guidance selection items includes at least one of (a) desire to brightly shooting subject, (b) desire to backlight shooting, (c) desire natural color suitable for light source, (d) desire to beautifully blur away background of subject, (e) desire to focus in forward and backward direction, (f) desire to make shooting after verifying composition, (g) desire to reduce hand shake and (h) desire to make shooting with image quality suiting purpose.

2. The camera according to claim 1, wherein
   the display control means displays contents of the setting with any of a character, an icon, and an illustration.

3. The camera according to claim 1, wherein the plurality of guidance selection items of the first layer of the hierarchy is displayed on a different screen than the selection items of the second layer of the hierarchy.

4. A camera that can display, record and play digital data after converting an image captured with an image capturing element into the digital data, comprising:
   a guidance display setting means for displaying and setting, as a first layer of a hierarchy, a plurality of guidance selection items, each item being represented as an expression corresponding to an intention of a person who takes a photo and indicating a desired finished quality of a shot image instead of a parameter value setting, to be used when capturing an image;
   a recording means for correspondingly recording more than one selection item that indicates a shooting operation condition instead of a parameter value setting, to be used when capturing an image as a selection item of a second layer of the hierarchy that is a lower layer of each guidance selection item displayed on the first layer of the hierarchy;
   an item selection means for selecting a selection item, from the second layer, that indicates a shooting operation condition, and that is displayed in response to one guidance item selected from the guidance selection items set as the display of the first layer;
   a shooting control setting means for setting a shooting control for capturing an image with the image capturing element which corresponds to the item selected by the item selection means; and
   a control change prohibition means for prohibiting a direct control change with a control button in a state where the control is set by the shooting control setting means,
      wherein the plurality of guidance selection items includes at least one of (a) desire to brightly shooting subject, (b) desire to backlight shooting, (c) desire natural color suitable for light source, (d) desire to beautifully blur away background of subject, (e) desire to focus in forward and backward direction, (f) desire to make shooting after verifying composition, (g) desire to reduce hand shake and (h) desire to make shooting with image quality suiting purpose.

5. The camera according to claim 4, further comprising
   a shooting control setting release means for allowing the set control to be released only if a particular key input is made in a state where the control is set.

6. The camera according to claim 4, further comprising
   a mode for selecting a shooting guidance mode, wherein if the shooting guidance mode is selected, an input of an adjustment operation for shooting exposure is prohibited until this mode is released.

7. The camera according to claim 4, wherein the plurality of guidance selection items of the first layer of the hierarchy is displayed on a different screen than the selection items of the second layer of the hierarchy.

8. The camera according to claim 5, wherein
   the particular key input is made by a MENU button.

9. A method for controlling a camera that can display, record and play digital data after converting an image captured with an image capturing element into the digital data, comprising:
   displaying, as a first layer of a hierarchy, a plurality of guidance selection items, each item being represented as an expression corresponding to an intention of a person who takes a photo and indicating a desired finished quality of a shot image instead of a parameter value setting, to be used when capturing an image;

receiving a user selection of one guidance item from the plurality of guidance selection items displayed in the first layer of the hierarchy;

displaying, as a second layer of the hierarchy, one or more further selection items instead of a parameter value setting, to be used when capturing an image, each indicating a shooting operation condition and corresponding to the guidance item selected by the user;

receiving a user designation of a further selection item instead of a parameter value setting, to be used when capturing an image, each item indicating one shooting operation condition from among the further selection items that are displayed as the second layer and that indicate the shooting operation condition;

setting the control of the shooting operation in accordance with the designated shooting operation condition;

displaying information relating to a control of the set shooting operation; and capturing an image with the image capturing element under a control based on the control of the displayed shooting operation, wherein the plurality of guidance selection items includes at least one of (a) desire to brightly shooting subject, (b) desire to backlight shooting, (c) desire natural color suitable for light source, (d) desire to beautifully blur away background of subject, (e) desire to focus in forward and backward direction, (f) desire to make shooting after verifying composition, (g) desire to reduce hand shake and (h) desire to make shooting with image quality suiting purpose.

10. The method for controlling a camera according to claim 9, wherein the plurality of guidance selection items of the first layer of the hierarchy is displayed on a different screen than the selection items of the second layer of the hierarchy.

11. The method for controlling a camera according to claim 9, wherein after the control of the shooting operation is set, an instruction of changing the set shooting operation condition is not accepted, and the instruction is allowed after a shooting is complete.

* * * * *